US012744286B2

(12) United States Patent
Motin et al.

(10) Patent No.: US 12,744,286 B2
(45) Date of Patent: Sep. 22, 2026

(54) MULTI-LAYER BATTERY SEPARATOR FOR ALKALINE BATTERY AND METHOD FOR MAKING

(71) Applicant: Mativ Holdings, Inc., Alpharetta, GA (US)

(72) Inventors: Vincent Motin, Clohars-Carnoet (FR); Christelle Bellouard, Quimper (FR); Axel Le Nozahic, Arzano (FR)

(73) Assignee: SWM Holdings US, LLC, Atlanta, GA (US)

( * ) Notice: Subject to any disclaimer, the term of this patent is extended or adjusted under 35 U.S.C. 154(b) by 754 days.

(21) Appl. No.: 17/945,019

(22) Filed: Sep. 14, 2022

(65) Prior Publication Data

US 2023/0086918 A1 Mar. 23, 2023

Related U.S. Application Data

(60) Provisional application No. 63/245,345, filed on Sep. 17, 2021.

(51) Int. Cl.

| | |
|---|---|
| ***H01M 50/457*** | (2021.01) |
| ***H01M 10/24*** | (2006.01) |
| ***H01M 50/414*** | (2021.01) |
| ***H01M 50/429*** | (2021.01) |
| ***H01M 50/44*** | (2021.01) |
| ***H01M 50/497*** | (2021.01) |

(52) U.S. Cl.

CPC ......... *H01M 50/457* (2021.01); *H01M 10/24* (2013.01); *H01M 50/414* (2021.01); *H01M 50/4295* (2021.01); *H01M 50/44* (2021.01); *H01M 50/497* (2021.01)

(58) Field of Classification Search

CPC ............. H01M 50/457; H01M 50/497; H01M 50/4295; H01M 50/414; H01M 50/44; H01M 10/24

See application file for complete search history.

(56) References Cited

U.S. PATENT DOCUMENTS

| | | | | |
|---|---|---|---|---|
| 5,336,573 A | 8/1994 | Zuckerbrod et al. | | |
| 5,645,956 A | 7/1997 | Degen et al. | | |
| 6,379,836 B1 | 4/2002 | Kubo et al. | | |
| 6,607,859 B1 * | 8/2003 | Tanaka | H01M 50/417 | 429/147 |
| 2003/0096171 A1 | 5/2003 | Thrasher et al. | | |
| 2008/0305389 A1 | 12/2008 | Arora et al. | | |
| 2011/0114496 A1 * | 5/2011 | Dopp | H01M 4/8631 | 204/290.01 |
| 2012/0183862 A1 * | 7/2012 | Gupta | D04H 1/43838 | 429/255 |
| 2013/0149614 A1 | 6/2013 | Kubo et al. | | |
| 2013/0183569 A1 | 7/2013 | Hayakawa et al. | | |
| 2014/0134498 A1 | 5/2014 | Lim et al. | | |
| 2014/0217013 A1 | 8/2014 | Sato et al. | | |
| 2016/0049627 A1 | 2/2016 | Hu et al. | | |
| 2017/0232371 A1 | 8/2017 | Anantharamaiah et al. | | |
| 2018/0123106 A1 * | 5/2018 | Shin | H01M 50/403 | |
| 2018/0331340 A1 * | 11/2018 | Lintz | H01M 50/44 | |
| 2020/0063373 A1 | 2/2020 | Parker et al. | | |
| 2021/0111463 A1 * | 4/2021 | Sakai | H01M 50/414 | |
| 2023/0012811 A1 * | 1/2023 | Cho | H01M 50/152 | |

FOREIGN PATENT DOCUMENTS

| | | | |
|---|---|---|---|
| CN | 111640945 A * | 9/2020 | B82Y 30/00 |
| EP | 2940703 A1 | 11/2015 | |
| EP | 3952017 A1 | 2/2022 | |
| JP | H0574439 A | 3/1993 | |
| JP | 2012109268 A | 6/2012 | |
| JP | 2014026877 A | 2/2014 | |
| JP | 2014123443 A | 7/2014 | |
| JP | 2017157348 A | 9/2014 | |
| JP | 2015109290 A | 6/2015 | |
| JP | 2017157349 A | 9/2017 | |
| WO | WO2017146825 A1 | 8/2017 | |
| WO | WO2017150439 A1 | 9/2017 | |
| WO | WO2019064205 A1 | 4/2019 | |
| WO | WO-2019156172 A1 * | 8/2019 | |

OTHER PUBLICATIONS

EPO machine generated English translation of CN-111640945-A (Year: 2020).*

EPO machine generated English translation of WO-2019156172-A1 (Year: 2019).*

International Search Report and Written Opinion; International Application No. PCT/US2022/043543; Dec. 28, 2022.

(Continued)

*Primary Examiner* — Kimberly Wyluda

(74) *Attorney, Agent, or Firm* — Dority & Manning, P.A.

(57) ABSTRACT

Battery separators and methods of making such separators are provided. The separators can be used in various alkaline batteries such as a $Zn/MnO_2$ battery or the like. An alkaline battery separator comprises a first layer of polyvinyl alcohol fibers, a second layer of cellulose or a cellulose derivative and a third layer comprising a water soluble polymer. The battery separator has reduced pore sizes to reduce clogging, while still maintaining desirable wet ionic resistance, basis weight and absorption performance.

25 Claims, No Drawings

(56) References Cited

OTHER PUBLICATIONS

Ji et al., "Cellulose and poly(vinyl alcohol) composite gels as separators for quasi-solid-state electric double layer capacitors" Cellulose 26, 1055-1065 (2019); Nov. 12, 2018 (Nov. 12, 2018) entire document, especially abstract, p. 1057 (Abstract Only). [online] <https://link.springer.com/article/10.1007/s10570-018-2123-6#citeas>.
European Patent Office; International Search Report; International Patent Application No. PCT/IB2018/057465; Dec. 13, 2018.
China National Intellectual Property Administration (CNIPA); Office Action; PRC (China) Patent Application No. 201880062729.8; dated Feb. 24, 2022.
Japanese Intellectual Property Office (JPO); Office Action; Japanese Patent Application No. 2020-537890 ; dated Jul. 4, 2022.
European Patent Office; Communication Pursuant to Article 94(3) EPC; EP Application No. 18807115.3 dated Mar. 24, 2022.
China National Intellectual Property Administration (CNIPA); Office Action; PRC (China) Patent Application No. 201880062729.8; dated Sep. 23, 2022.
European Patent Office; Communication Pursuant to Article 114(2) EPC; EP Application No. 18807115.3 dated Jun. 29, 2021.

* cited by examiner

MULTI-LAYER BATTERY SEPARATOR FOR ALKALINE BATTERY AND METHOD FOR MAKING

CROSS-REFERENCE TO RELATED APPLICATIONS

This application claims the benefit of U.S. Provisional Application Ser. No. 63/245,345, filed Sep. 17, 2021, the complete disclosure of which is incorporated herein by reference in its entirety.

TECHNICAL FIELD

The field generally relates to battery separators and methods of making such separators and more particularly to a multi-layer alkaline battery separator having a reduced pore size.

BACKGROUND

Separator papers for alkaline batteries serve as a mechanical barrier between the electrodes to prevent shorting while allowing for ionic transport through the electrolyte in the pores. Separators should have good mechanical integrity, chemical inertness, well-defined and consistent porosity and tortuosity in order to uniformly transport the ions between the electrodes. In recent years, separators made from fibers have been considered as an alternative to more traditional non-fiber polyolefin based separators. Separator papers used in alkaline batteries often comprise blends of polyvinyl alcohol (PVA) fibers and cellulose or cellulose derivatives such as rayon or lyocell.

Using fibers in the manufacturing of battery separators provides numerous benefits. In addition to allowing for various fiber compositions, separators made from fibers may be designed at various levels of basis weight. The availability of low count PVA, as well as rayon fibers, has enabled a trend toward lighter material, targeting space savings in the cells to permit higher amounts of active material and enhance discharge performance. The use of fibers in the manufacturing of battery separators also contributes significantly to reduced costs as compared to more traditional polyolefin materials.

Furthermore, battery separators made from fibers allow for reduced pore sizes to help control the generation of dendrites which may hinder performance, or in some cases, cause short circuits. Reduced pore size also allows for battery separators to better block the penetration of active components of the electrode materials and any conductive additives.

It would be advantageous to provide alkaline battery separators having a reduced pore sizes while still providing the desirable wet ionic resistance and absorption performance.

SUMMARY

Alkaline battery separators and methods of making such separators are provided. The separators can be used in various alkaline batteries such as a Zn/$MnO_2$ battery or the like.

In one aspect, an alkaline battery separator comprises a first layer of polyvinyl alcohol fibers, a second layer of cellulose or a cellulose derivative and a third layer comprising a water soluble polymer. The battery separator has reduced pore sizes to reduce clogging, while still maintaining desirable wet ionic resistance, basis weight and absorption performance.

In embodiments, the third layer comprises a coating adhered to a first surface of the second layer. The second layer comprises a second surface and the first layer is adhered to the second surface. Preferentially applying the coating to the first surface of the second layer further tightens the pore size, while keeping the wet ionic resistance from increasing exponentially.

In embodiments, the third layer comprises polyvinyl alcohol, microcrystalline cellulose, or a blend of polyvinyl alcohol and microcrystalline cellulose. The third layer may further include a wetting agent to improve the wettability of the third layer.

The third layer preferably has a relatively low basis weight to mitigate the increase in ionic resistance across the separator. In embodiments, the third layer materials range from about 0.1 g/$m^2$ to about 10 g/$m^2$ preferably in an amount between about 2.5 to about 7.5 g/$m^2$, and more preferably in an amount of about 2.5 g/$m^2$.

In embodiments, the third layer comprises a blend of polyvinyl alcohol and microcrystalline cellulose gel. The ratio of the polyvinyl alcohol and the microcrystalline cellulose gel may vary from about 70/30 to about 30/70, preferably about 50% polyvinyl alcohol and about 50% microcrystalline cellulose gel. In an exemplary embodiment, the third layer comprises about 2.5 g/$m^2$ of polyvinyl alcohol and microcrystalline cellulose gel blended in a 50/50 ratio.

In embodiments, the first layer comprises a blend of polyvinyl alcohol and one of lyocell fibers, dissolving pulp, mercerized pulp or a combination thereof. The first layer may include polyvinyl alcohol fibers in a ratio (by weight) of at least about 20%, in embodiments at least about 30%, and in other embodiments at least about 55%. The first layer may further include lyocell fibers, such as Lyocell, in a ratio (by weight) of at least about 25%, in embodiments at least about 35%, and in other embodiments at least about 45%. In one such embodiment, the first layer comprises polyvinyl alcohol and lyocell fibers in a ratio of weight from about 50% to about 75% polyvinyl alcohol and about 25% to about 50% lyocell fibers, preferably about 55% polyvinyl alcohol by weight and at about 45% lyocell fibers by weight.

The first layer may comprise both non-water soluble and water soluble polyvinyl fibers. In an exemplary embodiment, the first layer comprises about 40% non-water soluble polyvinyl fibers and about 15% water soluble polyvinyl fibers.

The first layer may weight about 10 g/m2 to about 40 g/2, preferably about 15 g/$m^2$ to about 30 g/$m^2$.

In embodiments, the second layer comprises cellulose fibers, cellulose nanofilaments, or microfibrillated cellulosic fibers. In one such embodiment, the second layer comprises one of lyocell fibers, dissolving pulp, mercerized pulp or a combination thereof.

The second layer also preferably has a relatively low basis weight to mitigate the increase in ionic resistance across the separator. In embodiments, the second layer weighs about 0.5 g/$m^2$ to about 15 g/$m^2$ or about 2.5 g/$m^2$ to about 10 g/$m^2$ and preferably about 5.0 g/$m^2$.

The maximum pore size of the separator may be less than about 0.55 μm, preferably less than about 0.1 μm. In one embodiment, the maximum pore size of the separator is less than or equal to about 0.075 μm.

The mean pore size of the separator may be less than about 0.32 μm, or less than about 0.2 μm, or less than or equal to about 0.1876 μm.

The ionic resistance of the separator is less than about 50 $mOhm/cm^2$. In one embodiment, the ionic resistance is less than or equal to about 37.5 $mOhm/cm^2$.

In another aspect, an alkaline battery separator comprises at least one layer comprising polyvinyl alcohol fibers and a cellulose or a cellulose derivative and a coating adhered to the at least one layer comprising a water-soluble polymer, wherein the separator has a maximum pore size of less than about 1.0 um.

In embodiments, the at least one layer further comprises lyocell fibers and/or a microcrystalline cellulose.

In embodiments, the separator has a maximum pore size of less than about 0.55 um. In certain embodiments, the coating comprises a polyvinyl alcohol and the separator has a maximum pore size of less than about 0.2 um. In other embodiments, the coating further comprises a microcrystalline cellulose and the separator has a maximum pore size of less than about 0.1 um, preferably less than or equal to about 0.075 μm.

In another aspect, a method for making an alkaline battery separator comprises forming a first layer comprising polyvinyl alcohol fibers, forming a second layer comprising a cellulose or a cellulose derivative and coating one of the first or second layers with a third layer comprising a water soluble polymer.

The coating may be applied with a bar coating, a curtain coating, a roll coater, a slot die coater, a spray coater, flexography coater with engraved anyloxed rolls (i.e., a CI press) or the like. In an exemplary embodiment, the coating is applied with a bar coating or a CI press coating.

In embodiments, the second layer has a first surface and a second surface opposite the first surface. The coating is formed on the first surface and the first layer is adhered to the second surface. Preferentially applying the coating to the first surface of the second layer further tightens the pore size, while keeping the wet ionic resistance from increasing exponentially.

In embodiments, the third layer or coating further comprises a cellulose gel. In one such embodiment, the third layer comprises a blend of a polyvinyl alcohol and a microcrystalline cellulose gel.

In embodiments, the first layer is a wet laid paper material. The first layer may comprise a blend of polyvinyl alcohol and one of lyocell fibers, dissolving pulp, mercerized pulp or a combination thereof. The polyvinyl alcohol may be non-water soluble, water soluble or a combination thereof.

The method may include separately mixing and dispersing lyocell fibers and polyvinyl alcohol fibers and then mixing the dispersed fibers together. Water may be drained from the mixed fibers, and the fibers may be wet laid onto an endless wire. The continuous wet sheet may be pressed and dried and impregnated with a wetting agent to further improve the wettability of the separator with the electrolyte.

The second layer may comprise cellulose fibers, cellulose nanofilaments, or microfibrillated cellulosic fibers. In one such embodiment, the second layer comprises one of lyocell fibers, dissolving pulp, mercerized pulp or a combination thereof. In embodiments, the method further comprises draining lyocell fibers onto the first layer to form a wet laid second layer. The wet laid process may be a laid papermaking process, a slot die process combined with drainage boxes or the like. The first and second layers may be impregnated with a wetting agent.

The recitation herein of desirable objects which are met by various embodiments of the present disclosure is not meant to imply or suggest that any or all of these objects are present as essential features, either individually or collectively, in the most general embodiment of the present disclosure or in any of its more specific embodiments.

DETAILED DESCRIPTION

Except as otherwise noted, any quantitative values are approximate whether the word "about" or "approximately" or the like are stated or not. The materials, methods, and examples described herein are illustrative only and not intended to be limiting. Any molecular weight or molecular mass values are approximate and are provided only for description.

Disclosed herein are alkaline battery separators and methods of making such separators are provided. The battery separators have reduced pore sizes to reduce clogging, while still maintaining desirable wet ionic resistance, basis weight and absorption performance. The separators can be used in various alkaline batteries such as a $Zn/MnO_2$ battery or the like.

One such multi-layer alkaline battery separator disclosed herein includes a first layer of made from a blend of polyvinyl alcohol fibers and lyocell fibers, a second layer including cellulose or a cellulose derivative, and a third coating layer including polyvinyl alcohol, microcrystalline cellulose, or a combination thereof. The separator has a controlled pore size, i.e., the pore size can be predetermined or preselected. The separator can be used in various alkaline batteries such as a $Zn/MnO_2$ battery or the like.

The first layer is made from a blend of polyvinyl alcohol fibers and lyocell fibers. The first layer may include polyvinyl alcohol fibers in a ratio (by weight) of at least about 20%, in embodiments at least about 30%, and in other embodiments at least about 55%. The first layer may further include lyocell fibers, such as Lyocell, in a ratio (by weight) of at least about 25%, in embodiments at least about 35%, and in other embodiments at least about 45%. In embodiments, the first layer may include up to 55% polyvinyl alcohol fibers and up to 45% of lyocell fibers, such as Lyocell. In embodiments, the highly fibrillated lyocell fibers may be replaced by highly refined dissolving pulp or mercerized pulp, or a blend of these pulps with lyocell fibers.

The cellulose and cellulose derivatives used in the second layer of the battery separator can include but are not limited to natural cellulose (wood fiber and pulp, cotton, hemp, etc.) and regenerated cellulose (e.g., rayon and Lyocell fibers). In embodiments, the fibers of the second layer may be nanofilaments or microfibrillated cellulosic fibers. In embodiments, the fibers of the second layer may be replaced or mixed with highly refined dissolving pulp or mercerized pulp, or a blend of these pulps with the cellulosic fibers. The second layer material may be present in an amount between about 0.5 $g/m^2$ to about 15 $g/m^2$, preferably in an amount ranging from about 2.5 to about 10 $g/m^2$, and in yet another embodiment, in an amount that is about 5 $g/m^2$.

The third coating layer may include polyvinyl alcohol, microcrystalline cellulose, or a blend of polyvinyl alcohol and microcrystalline cellulose. In embodiments, the third layer may further include a wetting agent to improve the wettability of the third layer. In embodiments, the third layer materials range from 0.1 $g/m^2$ to 10 $g/m^2$ preferably in an amount between 2.5 to 7.5 $g/m^2$, and more preferably in an amount of about 2.5 $g/m^2$.

In embodiments, tri-layer battery separators in accordance with the present disclosure may have a first layer including a blend of polyvinyl alcohol fibers and lyocell fibers having a basis weight of 20 $g/m^2$ containing 45% of highly fibrillated lyocell fibers, 40% of non-water soluble polyvinyl alcohol fibers and 15% of water soluble polyvinyl alcohol fibers, a second layer including 5 $g/m^2$ of Lyocell, and a third coating layer including between about 2.5 $g/m^2$ and 7.5 $g/m^2$ of a 50/50 ratio blend of high molecular weight polyvinyl alcohol resin and microcrystaline cellulose gel.

Generally, a method of making the separator includes the first step of forming the first layer by highly fibrillating a cellulose derivative, for example, lyocell fibers, and optionally, cellulose. Cellulose fibrillation can be achieved using mechanical refiners such as a single disc refiner, a double disc refiner, a conical refiner, a rotating cylinder refiner, or other types of refiners used to mechanically grind or process cellulose or cellulose derivatives to produce individual fibers and smaller fibrillar elements. The feed material for this process may be previously treated cellulosic material (such as wood chips, annual plants, etc.) formed into pulp. The previous treatment of the cellulosic material to produce pulp used as the feed material can be a result of chemical digestion, such as Kraft cooking, sulfite cooking, soda cooking, etc., mechanical refining, a combination of chemical digestion and refining, or other known processes.

Fibrillation can be of various duration and energy levels, such as 125 min. to 200 min. at 185 KW to 200 KW of total energy corresponding to a Specific Edge Loading (SEL) of 0.65 to 0.75 J/m. The fibrillation process is performed on 30 g/l fiber suspensions. Generally, fibrillation occurs over a long period of time at a low energy, the goal being to introduce a given amount of energy such as 1200 to 1500 KWH/T of total energy (700 to 1150 kWh/T of specific energy) to the cellulose to reach a fibrillation level in the range of 140 and 100 Canadian Standard Freeness (CSF) and even between 37 and 25 CSF. Resultant fibrillated fibers typically have a width of 16-20 microns and a length of 1000 to 1150 microns. In the fibrillation process, the long duration is preferred to the high level of energy in order to avoid fiber cutting.

Once the fibrillation process has been performed and controlled, the cellulose and/or cellulose derivative is diluted with cold water to cool down the temperature below 40° C. in anticipation of the addition of both water soluble and subject PVA fibers in the pulper. Both types of PVA fibers typically have cut lengths of 2 to 4 mm. When thinner fibers (e.g., lower denier (d) or dTex) are used, fibers of shorter length are necessary to avoid unexpected fiber entanglement.

A more complete description of a suitable first layer and method of manufacturing the first layer can be found in publication WO 2019/064205, the complete disclosure of which is incorporated herein by reference in its entirety for all purposes.

A second layer is then made from short cut lyocell fibers dispersed in water and processed through pulp refining stages using a desired pulp refiner (e.g. Hollander beater, valley beater, single or multiple disc refiners, multidisc refiners, conical refiners, or PFI mill beaters). The lyocell fibers are refined until they have reached the desired freeness index expression in ° SR/CSF and the desired fibre dimensions (length and thickness). Ideally, ° SR index should be above 85° SR, preferably above 90° SR. This desired refining intensity allows for the tightening of the pore size of the second layers' fibers while using as little pulp per square meter as necessary. The second layer material may be present in an amount between about 0.5 $g/m^2$ to about 15 $g/m^2$, preferably in an amount ranging from about 2.5 to about 10 $g/m^2$, and in yet another embodiment, in an amount that is about 5 $g/m^2$.

Once evenly and thoroughly dispersed in a mixing chest, the first layer of lyocell fibers and PVA fibers are processed through an inclined paper machine on which water is drained, as the fibers are wet laid on an endless wire. The second layer is then drained separately on its own endless wire. When fully drained the two layers are then combined to form a continuous wet sheet. The wet laid process may use papermaking processes, or a slot die process combined with drainage boxes. The continuous wet sheet may then be picked up and dried. The resulting paper material may then be impregnated with a solution containing a wetting agent, using a size-press, to further improve the wettability of the separator. A final round of drying may then be performed to allow for collection of the continuous sheet as it is wound on a core.

In embodiments, the first and second layer may instead be drained simultaneously on the same endless wire. This process starts with the first layer being drained on an endless wire, and then continues with the second layer being drained on both the first layer, while still wet, and the endless wire. The wet laid process may use papermaking processes, or a slot die process combined with drainage boxes. Next, the continuous double layer sheet is processed through drying as described above, impregnation as described above, and lastly a final round of drying for winding and collection on a core.

The third layer is created by blending water soluble polymers (e.g. polyvinyl alcohol resin, carboxymethyl cellulose, starch, alginate) and microcrystalline cellulose dispersions, to create a blend of polyvinyl alcohol and microcrystalline cellulose gel. A surfactant or wetting agent may subsequently be added to the blend to improve the wettability of the third layer. The third layer material may be present in an amount between 0.1 $g/m^2$ to 10 $g/m^2$, in embodiments, in amounts between 2.5 to 7.5 $g/m^2$, in yet another embodiment, in an amount that is 2.5 $g/m^2$.

The third layer is used to coat a single side of the two-layer separator, preferably the top of the second layer, to further tighten the pore size while keeping the wet ionic resistance from increasing to undesirable ranges. The coating technology used to apply the coating may be a bar coating, a curtain coating, a roll coater, slot die coater, spray coater, or a flexography printer with engraved anyloxed rolls.

The third layer is then dried using any suitable drying method, for example, non-contact drying via infra-red dryers or an air heated oven.

The pore size of the presently described tri-layer battery separators are less than about 0.075 μm. Despite having a reduced pore size, the tri-layer battery separators of the present disclosure also have an ionic resistance that is below 50 $mOhm/cm^2$, maintaining an electrolyte absorption above 125 $g/m^2$. The base weight of tri-layer battery separators in accordance with the present disclosure is no more than 30 $g/m^2$.

EXAMPLES

The following non-limiting examples of illustrative alkaline battery separators were manufactured in accordance with the methods described above, with steps omitted where appropriate.

Example 1

A tri-layer battery separator was prepared having a first wetlaid layer having a basis weight of 20 $g/m^2$, the first layer including 45% of highly fibrillated lyocell fibers, 40% of non-water soluble polyvinyl alcohol fibers and 15% of water soluble polyvinyl alcohol fibers. The second layer included 5 g/m$^2$ Lyocell fibres refined to 94° SR and a third coating layer including 2.5 g/m$^2$ of high molecular weight polyvinyl alcohol resin and microcrystalline cellulose gel blended in a 50/50 ratio. The total basis weight, maximum pore size, ionic resistance, and other properties were measured and are shown in Table 1 below.

Example 2

A tri-layer battery separator was prepared having a first wetlaid layer, having a basis weight of 20 g/m$^2$, the first layer including 45% of highly fibrillated lyocell fibers, 40% of non-water soluble polyvinyl alcohol fibers and 15% of water soluble polyvinyl alcohol fibers. The second layer included 5 g/m$^2$ Lyocell fibres refined to 94° SR and a third coating layer including 5.0 g/m$^2$ of high molecular weight polyvinyl alcohol resin and microcrystalline cellulose gel blended in a 50/50 ratio. The total basis weight, maximum pore size, ionic resistance, and other properties were measured and are shown in Table 1 below.

Example 3

A bilayer battery separator was prepared having a first wetlaid layer having a basis weight of 20 g/m$^2$, the first layer including 45% of highly fibrillated lyocell fibers, 40% of non-water soluble polyvinyl alcohol fibers and 15% of water soluble polyvinyl alcohol fibers. The second layer included 5 g/m$^2$ Lyocell fibres refined to 94° SR. No coating layer was added. The total basis weight, maximum pore size, ionic resistance, and other properties were measured and are shown in Table 1 below.

Example 4

A tri-layer battery separator was prepared having a first wetlaid layer having a basis weight of 20 g/m$^2$, the first layer including 45% of highly fibrillated Lyocell fibers, 40% of non-water soluble polyvinyl alcohol fibers and 15% of water soluble polyvinyl alcohol fibers. The second layer included 5 g/m$^2$ Lyocell fibres refined to 94° SR (PFI Lab refiner) and a third coating layer including 2.5 g/m$^2$ of microcrystalline cellulose gel. The total basis weight, maximum pore size, ionic resistance, and other properties were measured and are shown in Table 1 below.

Example 5

A tri-layer battery separator was prepared having a first wetlaid layer having a basis weight of 20 g/m$^2$, the first layer including 45% of highly fibrillated Lyocell fibers, 40% of non-water soluble polyvinyl alcohol fibers and 15% of water soluble polyvinyl alcohol fibers. The second layer included 5 g/m$^2$ Lyocell fibres refined to 94° SR (PFI Lab refiner) and a third coating layer including 2.5 g/m$^2$ of high molecular weight polyvinyl alcohol resin. The total basis weight, maximum pore size, ionic resistance, and other properties were measured and are shown in Table 1 below.

TABLE 1

| # | Layer 1 | Layer 2 | Layer 3 | Basis weight - g/m$^2$ | Mean Pore Size - µm | Largest pore size - µm | Electrical Resistance - mΩ · cm$^2$ | KOH absorption - g/m$^2$ | KOH absorption - % |
|---|---|---|---|---|---|---|---|---|---|
| Example 1 | 55% PVA Fibers; and 45% fibrillated lyocell fibers | 5 g/m$^2$ LYOCELL °SR94 | Blend 50/50 High Molecular Weight PVA Resin/Microcrystalline cellulose gel 2.5 g/m$^2$ | 27.39 | — | 0.0750 | 28.38 | 138.4 | 505.3 |
| Example 2 | 55% PVA Fibers; and 45% fibrillated lyocell fibers | 5 g/m$^2$ LYOCELL °SR94 | Blend 50/50 High Molecular Weight PVA Resin/Microcrystalline cellulose gel 5.0 g/m$^2$ | 30.76 | — | 0.0720 | 37.50 | 139.1 | 452.2 |
| Example 3 | 55% PVA Fibers; and 45% fibrillated lyocell fibers | 5 g/m$^2$ LYOCELL °SR94 | None | 25.1 | 0.3246 | 1.4330 | 21.53 | 134.0 | 533.9 |
| Example 4 | 55% PVA Fibers; and 45% fibrillated lyocell fibers | 5 g/m$^2$ LYOCELL °SR94 | Microcrystalline cellulose gel 2.5 g/m$^2$ | 28.29 | 0.0055 | 0.5480 | 27.11 | 139.3 | 492.4 |
| Example 5 | 55% PVA Fibers; and 45% fibrillated lyocell fibers | 5 g/m$^2$ LYOCELL °SR94 | High Molecular Weight PVA Resin 2.5 g/m$^2$ | 27.82 | 0.1876 | 0.1980 | 33.95 | 133.7 | 480.6 |

As shown in table 1, the bilayer alkaline battery separator of Example 3 and the tri-layer battery separators of Examples 4 and 5 having a non-blended coating resulted in less desirable maximum pore size and electrical resistance values. However, the tri-layer battery separator of Example 2, having the blended coating, resulted in a separator having a more desirable maximum pore size below 0.1 µm as well as a desirable electrical resistance. The amounts of materials used in Example 1 provided even more desirable results, as the wet ionic resistance value was even lower than the separator of Example 2.

While the invention has been described in detail herein in accordance with certain preferred embodiments thereof, many modifications and changes therein may be effected by those skilled in the art. Accordingly, the foregoing disclosure should not be construed to be limited thereby but should be construed to include such aforementioned obvious variations and be limited only by the spirit and scope of the following claims.

For example, in a first aspect, a first embodiment is an alkaline battery separator comprising a first layer comprising polyvinyl alcohol fibers, a second layer comprising cellulose or a cellulose derivative and a third layer comprising a water soluble polymer.

A second embodiment is the first embodiment, wherein the third layer further comprises a cellulose gel.

A 3rd embodiment is any combination of the first 2 embodiments, wherein the third layer comprises a blend of a polyvinyl alcohol and a microcrystalline cellulose gel.

A 4th embodiment is any combination of the first 3 embodiments, wherein the third layer comprises a surfactant.

A 5th embodiment is any combination of the first 5 embodiments, wherein the third layer comprises a coating adhered to a first surface of the second layer.

A 6th embodiment is any combination of the first 5 embodiments, wherein the second layer comprises a second surface and the first layer is adhered to the second surface.

A 7th embodiment is any combination of the first 6 embodiments, wherein the blend of the third layer comprises about 50% polyvinyl alcohol and about 50% microcrystalline cellulose gel.

An 8th embodiment is any combination of the first 7 embodiments, wherein the third layer weighs about 0.1 g/m$^2$ to about 10.0 g/m$^2$.

A 9th embodiment is any combination of the first 8 embodiments, wherein the third layer weighs about 2.5 g/m$^2$ to about 7.5 g/m$^2$.

A 10th embodiment is any combination of the first 9 embodiments, wherein the third layer comprises about 2.5 g/m$^2$ of polyvinyl alcohol and microcrystalline cellulose gel blended in a 50/50 ratio.

An 11th embodiment is any combination of the first 10 embodiments, wherein the first layer comprises a blend of polyvinyl alcohol and one of lyocell fibers, dissolving pulp, mercerized pulp or a combination thereof.

A 12th embodiment is any combination of the first 11 embodiments, wherein the first layer comprises about 55% polyvinyl alcohol by weight and at about 45% lyocell fibers by weight.

A 13th embodiment is any combination of the first 12 embodiments, wherein the first layer comprises about 40% non-water soluble polyvinyl fibers and about 15% water soluble polyvinyl fibers.

A 14th embodiment is any combination of the first 13 embodiments, wherein the first layer weighs about 15 g/m$^2$ to about 30 g/m$^2$.

A 15th embodiment is any combination of the first 14 embodiments, wherein the second layer comprises cellulose fibers, cellulose nanofilaments, or microfibrillated cellulosic fibers.

A 16th embodiment is any combination of the first 15 embodiments, wherein the second layer comprises one of lyocell fibers, dissolving pulp, mercerized pulp or a combination thereof.

A 16th embodiment is any combination of the first 15 embodiments, wherein the second layer weighs about 0.5 g/m$^2$ to about 15 g/m$^2$.

A 17th embodiment is any combination of the first 16 embodiments, wherein the second layer weighs about 2.5 g/m$^2$ to about 10 g/m$^2$.

An 18th embodiment is any combination of the first 17 embodiments, wherein the second layer weighs about 5.0 g/m$^2$.

A 19th embodiment is any combination of the first 18 embodiments, wherein the maximum pore size of the separator is less than about 0.1 μm.

A 20th embodiment is any combination of the first 19 embodiments, wherein the ionic resistance is less than about 50 mOhm/cm$^2$.

A 21st embodiment is any combination of the first 20 embodiments, wherein the maximum pore size of the separator is less than or equal to about 0.075 μm.

A 22nd embodiment is any combination of the first 21 embodiments, wherein the ionic resistance is less than or equal to about 37.5 mOhm/cm$^2$.

A 23rd embodiment is a battery comprising any combination of the first 22 embodiments.

In another aspect, a first embodiment is an alkaline battery separator comprising at least one layer comprising polyvinyl alcohol fibers and a cellulose or a cellulose derivative and a coating adhered to the at least one layer comprising a water soluble polymer, wherein the separator has a maximum pore size of less than about 1.0 μm.

A second embodiment is the first embodiment, wherein the at least one layer further comprises lyocell fibers.

A third embodiment is any combination of the first 2 embodiments, wherein the at least one layer further comprises a microcrystalline cellulose.

A 4th embodiment is any combination of the first 3 embodiments, wherein the separator has an ionic resistance less than about 50 mOhm/cm2.

A 5th embodiment is any combination of the first 4 embodiments, wherein the separator has an ionic resistance less than about 37.5 mOhm/cm2.

A 6th embodiment is any combination of the first 5 embodiments, wherein the separator has a maximum pore size of less than about 0.55 um.

A 7th embodiment is any combination of the first 6 embodiments, wherein the coating comprises a polyvinyl alcohol and the separator has a maximum pore size of less than about 0.2 um.

An 8th embodiment is any combination of the first 7 embodiments, wherein the coating further comprises a microcrystalline cellulose and the separator has a maximum pore size of less than about 0.1 um.

A 9th embodiment is battery comprising any combination of the first 8 embodiments.

In a third aspect, a first embodiment is a method for making an alkaline battery separator. The method comprises forming a first layer comprising polyvinyl alcohol fibers, forming a second layer comprising a cellulose or a cellulose derivative and coating one of the first or second layers with a third layer comprising a water-soluble polymer.

A second embodiment is the first embodiment, wherein the first layer comprises a blend of polyvinyl alcohol and one of lyocell fibers, dissolving pulp, mercerized pulp or a combination thereof.

A third embodiment is any combination of the first two embodiments, further comprising draining lyocell fibers onto the first layer to form a wet laid second layer.

A 4th embodiment is any combination of the first 3 embodiments, wherein the second layer has a first surface and a second surface opposite the first surface, and wherein the coating is formed on the first surface.

A 5th embodiment is any combination of the first 4 embodiments, wherein the first layer is adhered to the second surface.

A 6th embodiment is any combination of the first 5 embodiments, wherein the first layer is wet laid.

A 7th embodiment is any combination of the first 6 embodiments, wherein the third layer further comprises a cellulose gel.

An 8th embodiment is any combination of the first 7 embodiments, wherein the third layer comprises a blend of a polyvinyl alcohol and a microcrystalline cellulose gel.

A $9^{th}$ embodiment is any combination of the first 8 embodiments, wherein the third layer comprises a surfactant.

A $10^{th}$ embodiment is any combination of the first 9 embodiments, wherein the coating is applied with a bar coating or a press coating.

A $11^{th}$ embodiment is a battery separator formed any combination of the first ten embodiments.

What is claimed is:

1. An alkaline battery separator comprising:
a first layer comprising polyvinyl alcohol fibers;
a second layer comprising cellulose or a cellulose derivative; and
a third layer comprising a water soluble polymer and a microcrystalline cellulose gel.

2. The alkaline battery separator of claim 1, wherein the third layer comprises a blend of a polyvinyl alcohol and the microcrystalline cellulose gel.

3. The alkaline battery separator of claim 1, wherein the third layer comprises a coating adhered to a first surface of the second layer and the second layer comprises a second surface and the first layer is adhered to the second surface.

4. The alkaline battery separator of claim 2, wherein the blend of the third layer comprises about 50% of the polyvinyl alcohol and about 50% of the microcrystalline cellulose gel.

5. The alkaline battery separator of claim 1, wherein the third layer weighs about 0.1 $g/m^2$ to about 10.0 $g/m^2$.

6. The alkaline battery separator of claim 1, wherein the third layer comprises about 2.5 $g/m^2$ of polyvinyl alcohol and the microcrystalline cellulose gel blended in a 50/50 ratio.

7. The alkaline battery separator of claim 1, wherein the first layer comprises a blend of the polyvinyl alcohol fibers and one of lyocell fibers, dissolving pulp, mercerized pulp, or a combination thereof.

8. The alkaline battery separator of claim 1, wherein the first layer comprises about 55% of the polyvinyl alcohol fibers by weight and at about 45% lyocell fibers by weight.

9. The alkaline battery separator of claim 1, wherein the second layer comprises one of lyocell fibers, dissolving pulp, mercerized pulp, or a combination thereof.

10. The alkaline battery separator of claim 1, wherein the second layer weighs about 0.5 $g/m^2$ to about 15 $g/m^2$.

11. The alkaline battery separator of claim 2, wherein a maximum pore size of the alkaline battery separator is less than about 0.1 μm.

12. The alkaline battery separator of claim 1, wherein the alkaline battery separator has an ionic resistance of less than about 50 $mOhm/cm^2$.

13. An alkaline battery separator comprising:
at least one layer comprising polyvinyl alcohol fibers and a cellulose or a cellulose derivative; and
a coating adhered to the at least one layer comprising a water soluble polymer and a microcrystalline cellulose gel, wherein the alkaline battery separator has a maximum pore size of less than about 1.0 μm.

14. The alkaline battery separator of claim 13, wherein the at least one layer further comprises lyocell fibers.

15. The alkaline battery separator of claim 13, wherein the at least one layer further comprises a microcrystalline cellulose.

16. The alkaline battery separator of claim 13, wherein the alkaline battery separator has an ionic resistance less than about 50 $mOhm/cm^2$.

17. The alkaline battery separator of claim 13, wherein the coating comprises a polyvinyl alcohol and the alkaline battery separator has a maximum pore size of less than about 0.2 μm.

18. The alkaline battery separator of claim 17, wherein the alkaline battery separator has a maximum pore size of less than about 0.1 μm.

19. A method for making an alkaline battery separator, the method comprising:
forming a first layer comprising polyvinyl alcohol fibers;
forming a second layer comprising a cellulose or a cellulose derivative; and
coating one of the first or second layers with a third layer comprising a water soluble polymer and a microcrystalline cellulose gel.

20. The method of claim 19, wherein the first layer comprises a blend of the polyvinyl alcohol fibers and one of lyocell fibers, dissolving pulp, mercerized pulp, or a combination thereof.

21. The method of claim 19, further comprising draining lyocell fibers onto the first layer to form a wet laid second layer.

22. The method of claim 19, wherein the second layer has a first surface and a second surface opposite the first surface, and wherein the coating is formed on the first surface and the first layer is adhered to the second surface.

23. The method of claim 19, wherein the first layer is wet laid.

24. The method of claim 19, wherein the third layer comprises a blend of a polyvinyl alcohol and the microcrystalline cellulose gel.

25. The method of claim 19, wherein the coating is applied with a bar coating or a press coating.

* * * * *